Aug. 4, 1959 M. FIEHL 2,898,104

RECORD CARD HANDLING DEVICE

Filed Nov. 30, 1956 4 Sheets-Sheet 1

INVENTOR.
MICHAEL FIEHL

BY William N. Barret Jr.

ATTORNEY

Aug. 4, 1959 M. FIEHL 2,898,104

RECORD CARD HANDLING DEVICE

Filed Nov. 30, 1956 4 Sheets-Sheet 2

Aug. 4, 1959 M. FIEHL 2,898,104
RECORD CARD HANDLING DEVICE
Filed Nov. 30, 1956 4 Sheets-Sheet 3

2,898,104

RECORD CARD HANDLING DEVICE

Michael Fiehl, Vestal, N.Y., assignor to International Business Machines Corporation, New York, N.Y., a corporation of New York Application November 30, 1956, Serial No. 625,264
9 Claims. (Cl. 271—61)

This invention relates to an apparatus for handling record cards; in particular, this apparatus comprises an improved record card storage tray.

As the rate of feeding record cards in record card machines is increased, the time available to a machine operator for adding record cards to the input, i.e., the hopper, of these machines and for removing record cards from the output, i.e., the stacker, has decreased to a point at which it is no longer feasible to perform these loading and unloading operations manually as has been customarily done in the past. This is particularly evident when it is considered that cards can conveniently be handled in batches of only about 1000 cards so that for a machine operating at 1000 c.p.m. (cards per minute) there will be a very large number of hand operations in a given time period since the operator must in one minute load and unload 1000 cards for a total of 2000 cards if an effective machine speed of 1000 cards a minute is to be maintained. To overcome this problem, a card handling apparatus is provided wherein cards to be added to the input of a machine or to be taken from the output of a machine may be conveniently handled in any number, such as 5000 (for example). This allows the operator of the machine greater time between changes by giving the machine a longer running time.

The apparatus consists of an improved card tray which is specifically adapted for use with the input of a record card machine and the output of a record card machine. The tray is further adapted to be used for the storage of cards and can be placed in a filing cabinet for convenient utilization so that when desired, a large batch of cards can be readily selected. This, in effect, allows for semiautomatic utilization of batches of cards. This is readily understood when it is realized that cards may be taken in batches of 5000, for example, from the filing cabinets, used in the machine and subsequently removed from the machine in like batches and replaced in the filing cabinet.

For use in the input of a record card machine, the illustrative and preferred card tray is particularly adapted for use with a feed mechanism as shown in the application Ser. No. 615,688, to M. Fiehl entitled, "Sheet Feeding and Handling Device," filed October 12, 1956, now Patent No. 2,863,662.

It is therefore an object of this invention to provide a record card handling device for handling large batches of record cards.

It is a further object of this invention to provide an improved record card storage tray in which record cards may be stored.

It is another and further object of this invention to provide an improved card tray which is adapted for use with the input feed mechanism of a record card machine.

Another object of this invention is to provide an improved card tray which is adapted to complement the output of a record machine so that the record card tray becomes an integral part of the structure forming the output of this machine.

Other objects of the invention will be pointed out in the following description and claims and illustrated in the accompanying drawings, which disclose, by way of examples, the principle of the invention and the best mode, which has been contemplated, of applying that principle.

Figure 1:
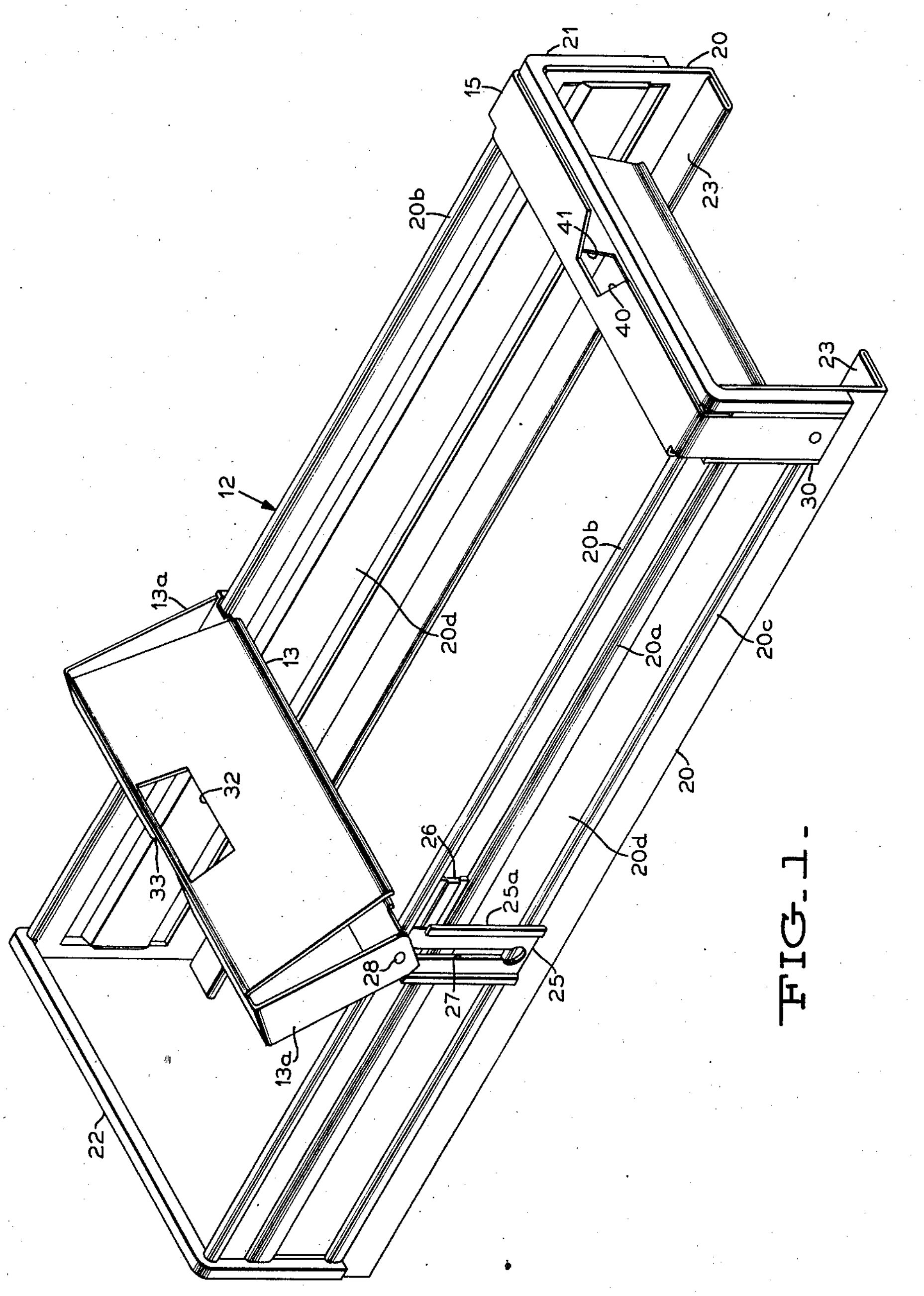
Figure 1 is a detailed isometric view of the card tray.

As shown in Figure 1, the tray consists of two vertically disposed L-shaped members 20 spaced in parallel relationship by bars 21 and 22 so that the enclosed space defines a place for the storage of cards. The bars 21 and 22 are secured to the L-shaped elements 20 in any desired manner, i.e., welding. Cards placed in said tray will be supported on the horizontal steps 23 of members 20 and the top edges of the contained cards will intersect members 20 below the top edges thereof. Across one end of the tray and adjacent bar 21 is a gate 15 which defines the physical end of the card tray. The gate 15 is identical to gate 13 shown more fully by the illustration. Gate 15 slides vertically in a slide 30 which is identical to the slide 25 except for a locking mechanism on slide 25 to be presently described. The slide 30 is fixed to the walls 20 of the tray by welding or some other means so that while gate 15 may be moved vertically it is fixed longitudinally with respect to the tray. These members previously described may be of any suitable material which contains the characteristics of rigidity and resistance to wear. It is to be understood that the tray is symmetrical about its longitudinal axis and therefore elements found on the visible side find counterparts on the opposite side.

The gate 13 is supported on a U-shaped slide 25 secured to the walls 20 in sliding relation by means of nylon bearings 26 (only one shown in this view) fixed to slide 25 by any suitable means. The gate 13, as shown in Fig. 1 consists of a unitary member including a U-shaped or channel-shaped member formed by the legs 13*a* and the connecting piece with a gate wall extending from the bight of the channel member to the ends of the sides 13*a* of the channel member. These bearings 26 are contained between protrusion 20*a* and formed edge 20*b* wherein the slide 25 is movable freely in a longitudinal direction but cannot be moved vertically. A slot 27 is formed in member 25 and edge reinforcements 25*a* are formed on the sides thereof. Sliding in the slot 27 is a stud 28 which is connected to the gate 13. The gate 13 is fixed by the slots 27 and studs 28, and the edge reinforcements 25*a* so that when placed in its lowered position it is secured from laterial movement. The upper ends of the edge reinforcements 25*a* are terminated at a point below the upper end of slot 27 so that the gate 13, when turned 45° from the vertical, will be supported by the edge reinforcements 25*a* in cooperation with stud 28 and slot 27.

The gates 13 and 15 are each shown as formed from a unitary piece of material but it is obvious that they may be constructed in any desired manner. An aperture 32 is formed in gate 13 so that a hand hold is formed for moving the gate 13. An aperture 41 is formed in gate 15 for the same purpose.

Figure 3:
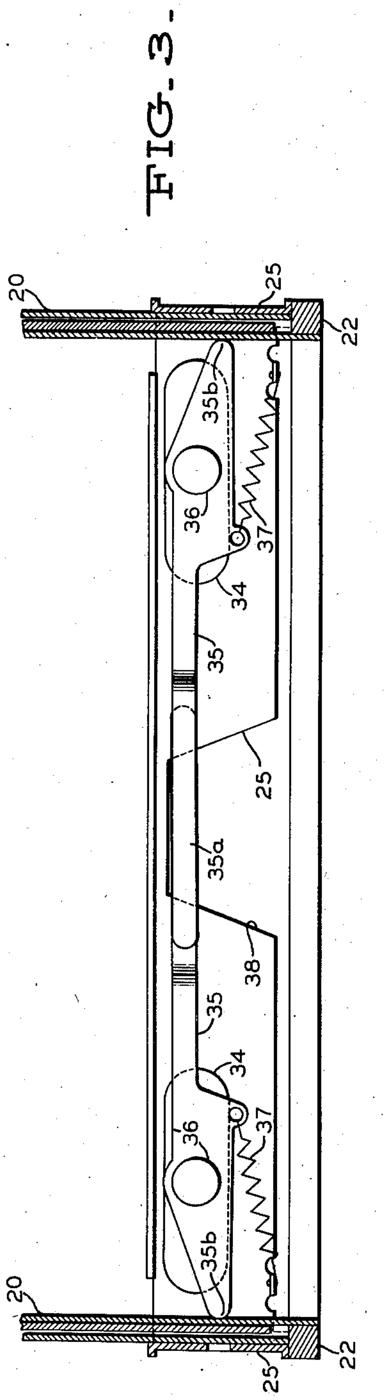
Figure 3 shows the underside of slide 25 which forms part of the tray.

Figure 3 shows the underside of slide 25 with the slide in close proximity to the bar 22. Two latches 35, pivoted at 36 on raised bearings 34 which are joined to slide 25 in any suitable manner, have actuating fingers 35*a* which overlie each other in a cutout 38 in slide 25. It is understood that cutout 38 has a counterpart 33 in gate 13, as shown fully by cutout 40 in gate 15 which is identical, so that the fingers may be operated when the gate 13 is in its lowered position. The actuating fingers have camming ends 35_b_ which cooperate with the interior surfaces of sides 20 to lock the slides 25 against longitudinal movement toward the bar 22 when the actuating fingers are not operated but which will not lock the slide 25 against movement toward bar 21. From an inspection of Fig. 3, it is noted that the members 35 are pivoted at 36 so that the distance between 36 and the camming surface 35_b_ would be the radius of a circle. The spring 37 biases the member 35 and consequently the camming surface 35_b_ so that it bears against the side wall 20 of the card tray and intersects at a point which forms an angle with the side wall 20. The direction of movement of the slide 25 is therefore not normal to the contact of the surface 35 with the side walls 20. When the slide 25 is moved toward the end 21, the only force directing camming surface 35_b_ into the side wall 20 is the springs 37 so that a friction is developed proportional to the strength of the spring 37. When the slide 25 is moved toward the end 22, friction is also developed proportional to the strength of the springs 37. The movement of the slide 25 through the pivot points 36 results in a turning motion about the pivots 36 which tends to force the camming surface 35_b_ into the surface 20 of the tray to increase the friction substantially over that caused by springs 37 alone to prevent motion of the slide 25 toward the end 22 when the ends 35_a_ have not been moved. Since slide 30 is fixed against longitudinal movement, no locking mechanism is necessary.

The formed metal protrusions 20_a_ and 20_c_ function to stiffen the tray and also to provide space for additional functions. The protrusion 20_b_ acts to hold slide 25 from vertical movement because bearings 26 are fitted between 20_a_ and 20_b_. In the case of member 30, the space provides an opening for bearing 26 to move into when movable gate 13 is at the closest point to bar 21. The bearing member 26 is made movable into the space between side 20 and slide 30 so that when there are very few cards in the tray, the gate 13 may still be placed in close proximity to stop 15 to hold these cards.

In using the card tray as a storage unit, it can be seen that there has been provided a closed rectangular container with an adjustable gate for securing the cards contained therein. The tray may be inserted into a conventional file drawer for storage therein and used whenever necessary. The fact that the card tray contains say 5000 cards allows the operator to handle large numbers of cards at a given time.

The present invention is adapted to be used at input side of a record card machine in combination with a sheet feeding and handling device such as shown in the aforementioned application to M. Fiehl. For use in that apparatus the card tray would be inserted into the magazine with the longitudinally fixed gate 15 at the point closest the feed wheels. The longitudinally fixed gate would then be raised perpendicularly and the cards from the tray would slide down onto the feed wheels. The card magazine has a raised center portion so that when the card tray is inserted into the magazine the cards contained in said tray will be raised from the side supports 23 of the tray. This allows the tray to be withdrawn freely and without disturbing the cards contained therein. In using the tray, card number one is always placed adjacent the fixed end of the tray so that this card will be the first to enter the associated machine.

Figure 2:
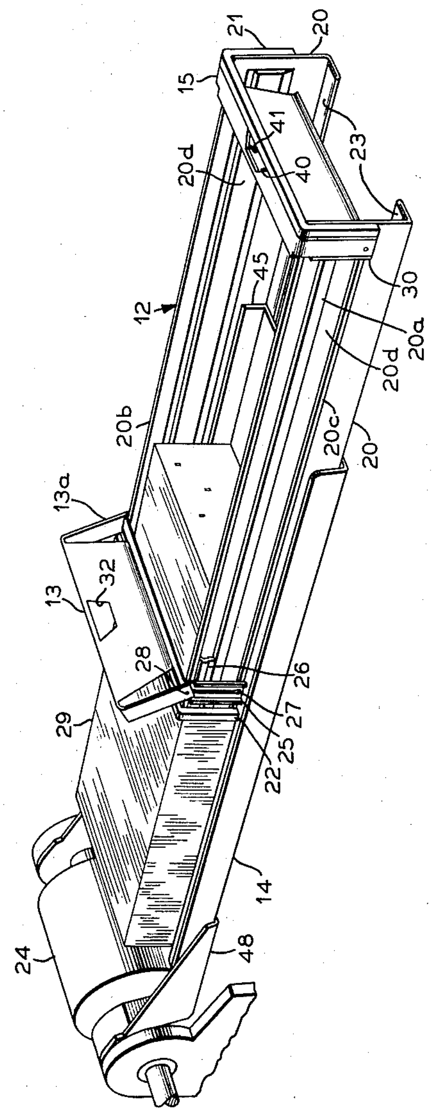
Figure 2 is a schematic illustration of the card tray used with a card support at the output of a record card machine.

Figure 2 illustrates the card tray 12 as used with the output of a record card machine which consists in a drum stacker 24 of conventional design in combination with a card support 14. Cards 29 from an associated machine (not shown) are transported to the stacker drum 24 which by means of grippers (not shown) attached to the periphery of the drum move the cards around the drum and place them on the card support for subsequent removal by an operator of the machine. The continuous placing of cards on the support forces the previously stacked cards away from the stacker drum. The tray is attached to the card support in such a manner that the sides of the tray will encompass the cards contained on the support without interference therewith. Here it is noted that the adjustable gate 13 is placed nearest the stacker drum 24. This allows card number one from the machine to enter the tray and stop at a position adjacent the fixed gate 15 so that the cards will then be in the same order as when they entered the record card machine.

The tray with the gate 13 raised is placed on the support in any desired longitudinal position either before or after cards from the machine are present on the support so that when it is desired to remove the cards between the adjustable gate 13 and fixed gate 15 the adjustable gate 13 is lowered and moved longitudinally toward the fixed gate 15 until the cards between these gates are held from movement. The tray is then removed. In the movement of the tray from the platform, the cards are forced by the gate 13 over the edges of the stack platform onto the horizontal steps 23 of the card tray. The tray then acts as a storage place for the cards contained therein until they are again needed for use in a machine. In the position of the tray, as shown in Figure 2, the tray is shown as an extension of the card platform 14 so that a larger number of cards may be stacked than by merely using the card support. In the particular example shown in Figure 2, if it were desired to remove the entire batch of cards 29, it would be necessary to move the card tray 12 over the cards 29 until the tray was in close proximity to the stacker drum before closing the gate 13 and proceeding as described infra.

Figure 4:
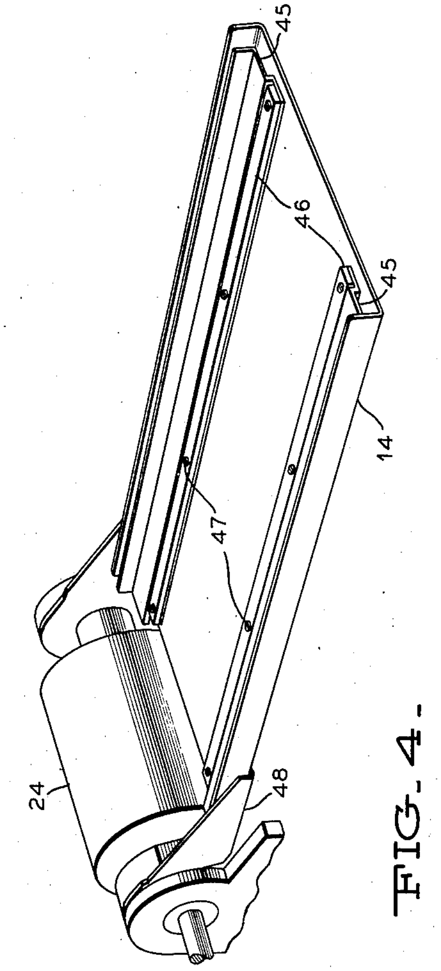
Figure 4 is an isometric view of the card support.

Figure 4 shows the card support 14 which is constructed in the form of a channel. Into this channel two tracks 45 are fastened in spaced parallel relation to one another by means of strips 46 and screws 47. The entire support 14 is attached to the drum stacker by brackets 48. The cards from drum stacker 24 are placed on the tracks 45. Between the tracks 45 and the support 14 an L-shaped space is provided to accommodate the card tray.

Figure 5:
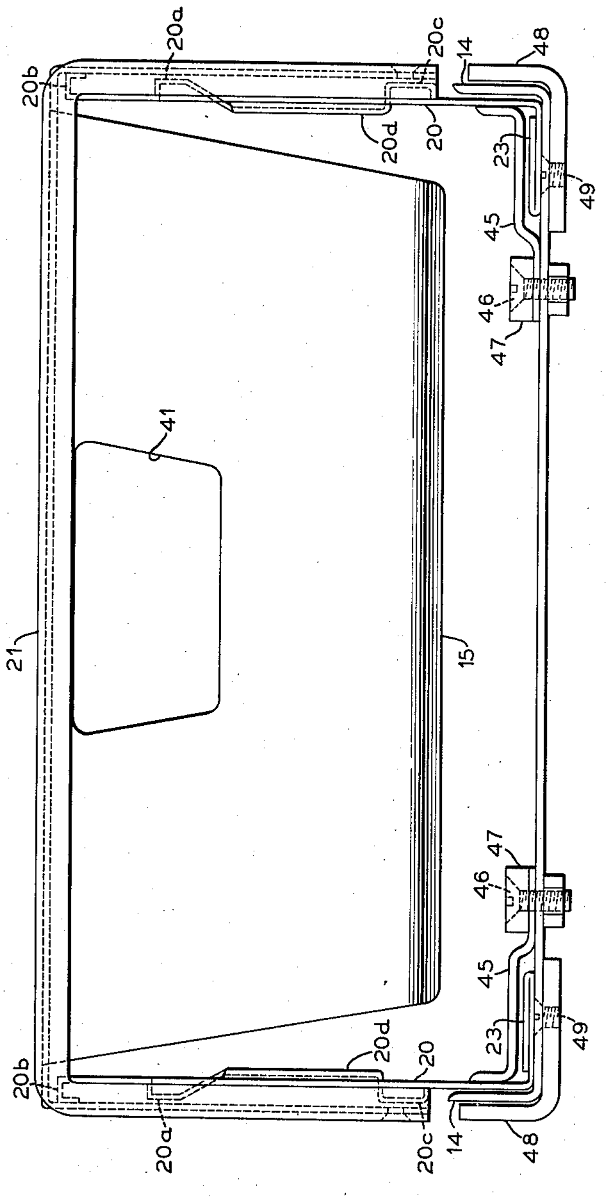
Figure 5 is an end view of the card tray and card support.

An end view of the tray and support 14 is shown in Figure 5. It is seen from this view that when the cards are on the tracks 45, they will not be in contact with the horizontal steps 23 of the tray so that the tray may be inserted onto the stack platform without disturbing the cards. The protuberance 20_d_ of the tray cooperates with the edges of the cards to keep them positioned laterally with respect to the tray when the tray is withdrawn from the platform.

In actual use the cards would be kept in the card trays in some sort of filing cabinet until needed, at which time the operator would be able to take a batch of say 5000 cards and insert this batch of cards into the sheet feeding and handling device of the afore-mentioned application and remove the tray. This tray or some other tray could then be placed at the output of the machine to receive the cards originally placed therein, at which time the tray with cards could be removed for a subsequent operation in some other machine or for refiling.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A record card storage apparatus comprising a pair of spaced L-shaped members including side walls and step portions adapted to support a plurality of record cards on the horizontal steps of said members, holding means fixed to corresponding ends of said L-shaped members to hold said members in fixed position relative to one another wherein said previously recited elements define a rectangular structure, gate means, and means for positioning said gate means at fixed longitudinal positions on said L-shaped members, said positioning means including means mounting said gate for perpendicular movement with respect to said steps.

2. A record card storage apparatus comprising a pair of spaced L-shaped members including side walls and step portions adapted to support a plurality of record cards on the horizontal steps of said members, rigid holding means fixed to corresponding ends of said L-shaped members to hold said members in fixed position relative to one another wherein said previously recited elements define a rectangular structure, a plurality of slide means mounted on said members, and a plurality of perpendicularly movable gates, each said gate comprising a channel shaped member including leg portions which are slidably attached to each respective slide and a gate wall secured to said channel shaped member, said gate when in a lowered position extending across the rectangular area of said structure and having one of its edges proximate the horizontal steps.

3. The apparatus of claim 2 wherein one of said slide means is mounted in sliding longitudinal relation to said L-shaped members while a second slide means is fixed adjacent one of said holding means.

4. The apparatus of claim 3 further including lock means mounted on said slidable slide means, said lock means comprising two spring biased levers pivoted at points symmetrical with the longitudinal center line of said storage apparatus and overlying each other at said center line, said levers having cam ends coacting with the inside walls of said L-shaped members to allow movement of said slide toward said immovable slide but preventing movement in the opposite direction when said levers are unactuated.

5. A record card handling arrangement for the output of a record card machine comprising a card support adapted to receive the cards from said machine, and a card container forming an integral part of said support, said card support including separating guide means for spacing the cards from said machine from the bottom of said card container wherein said card container is freely movable in said support.

6. The apparatus of claim 5 wherein said card container comprises a pair of spaced walls and vertically movable gate means slidable longitudinally with respect to said walls, said gate means when in a raised position being adapted to overlie any cards placed in said container; said gate means when in a lowered position having one of its edges in close proximity to said guide means.

7. The apparatus of claim 6 wherein the walls of said card container have step means formed substantially perpendicular thereon for retaining cards placed in said card container, said card support being formed of a channel shaped member of sufficient width to accommodate said container and said guide means comprising L-shaped members secured adjacent the sides of said channel shaped member and spaced from one another by substantially the length of one card wherein a longitudinally closed space is provided between the sides of said channel shaped member and said guides.

8. The apparatus of claim 7 wherein the steps of said card container and a vertical portion of the walls of said card container are adapted to slide in said longitudinally closed space and the walls of said container are movable in close proximity to the width edges of any cards contained on said support while said steps underlie any cards contained on said support.

9. The apparatus of claim 8 wherein when at least one of said stop means is in its raised position the card container is freely movable on said support to encompass any cards contained thereon and when said stop means are closed and there are any cards on said support one of said stop means will cooperate with said cards to move said cards in accordance with the movement of said container.

References Cited in the file of this patent

UNITED STATES PATENTS

| | | |
|---|---|---|
| 1,016,890 | Meleney | Feb. 6, 1910 |
| 1,063,657 | Choate | June 3, 1913 |
| 1,363,200 | Wells et al. | Dec. 21, 1920 |
| 1,710,754 | Welk | Apr. 30, 1929 |

FOREIGN PATENTS

| | | |
|---|---|---|
| 696,618 | France | Oct. 14, 1930 |
| 752,649 | Great Britain | July 11, 1956 |